United States Patent
Kochanowicz et al.

(10) Patent No.: US 8,308,974 B2
(45) Date of Patent: Nov. 13, 2012

(54) LIQUID DISPERSION AND THERMOPLASTIC COMPOSITIONS COMPRISING THE SAME

(75) Inventors: Christopher T. Kochanowicz, Spartanburg, SC (US); Jiannong Xu, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 210 days.

(21) Appl. No.: 12/711,804

(22) Filed: Feb. 24, 2010

(65) Prior Publication Data

US 2010/0224825 A1 Sep. 9, 2010

Related U.S. Application Data

(60) Provisional application No. 61/157,998, filed on Mar. 6, 2009.

(51) Int. Cl.
*C09K 3/00* (2006.01)

(52) U.S. Cl. .............. 252/182.23; 252/182.24; 524/922

(58) Field of Classification Search ............. 252/182.23, 252/182.33
See application file for complete search history.

(56) References Cited

U.S. PATENT DOCUMENTS

| 6,102,999 A | 8/2000 | Cobb, III et al. |
| 6,127,460 A | 10/2000 | Cobb, III et al. |
| 6,673,856 B1 | 1/2004 | Mentink |
| 2002/0137953 A1* | 9/2002 | Lever et al. ............... 549/453 |
| 2003/0109610 A1 | 6/2003 | Nomoto et al. |
| 2003/0139612 A1 | 7/2003 | Anderson et al. |
| 2006/0173108 A1 | 8/2006 | Xu et al. |
| 2008/0045638 A1* | 2/2008 | Chapman et al. ............ 524/425 |
| 2010/0158825 A1* | 6/2010 | Maesen et al. ............... 424/59 |

FOREIGN PATENT DOCUMENTS

WO  WO 2007/096894 A1  8/2007

* cited by examiner

*Primary Examiner* — Peter F Godenshwager
(74) *Attorney, Agent, or Firm* — Robert M. Lanning

(57) ABSTRACT

An additive composition comprises a liquid medium and a clarifying agent. The liquid medium is either a liquid hydrocarbon or a surfactant having an HLB of about 6 or less. The clarifying agent is dispersed in the liquid medium. In certain particular embodiments, the additive composition comprises both the liquid hydrocarbon and the surfactant, with the liquid hydrocarbon providing the medium for the additive composition. A thermoplastic polymer composition comprises a thermoplastic polymer and an additive composition of the invention. A method for producing a thermoplastic polymer composition comprises the steps of providing a thermoplastic polymer, providing an additive composition, and mixing the thermoplastic polymer and the additive composition to produce the thermoplastic polymer composition.

9 Claims, No Drawings

LIQUID DISPERSION AND THERMOPLASTIC COMPOSITIONS COMPRISING THE SAME

CROSS REFERENCE TO RELATED APPLICATIONS

This application claims, pursuant to 35 U.S.C. §119(e), the benefit of the filing date of U.S. Patent Application No. 61/157,998, which was filed on Mar. 6, 2009.

TECHNICAL FIELD OF THE INVENTION

The present invention is directed to a liquid dispersion suitable for use as a plastics additive. In particular, the liquid dispersion contains a liquid medium and a clarifying agent. The present invention is also directed to thermoplastic compositions comprising the liquid dispersion.

BRIEF SUMMARY OF THE INVENTION

The present invention generally provides additive compositions comprising a clarifying agent and a liquid medium. The clarifying agent can be an acetal compound that is the product of the reaction between an alditol (e.g., an unsubstituted alditol or a $C_1$-substitued alditol) and a benzaldehyde (e.g., an unsubstituted benzaldehyde or a substituted benzaldehyde). Suitable liquid media include, but are not limited to, liquid hydrocarbons, surfactants (e.g., surfactants having an HLB value of about 6 or less), and combinations thereof.

The additive compositions of the invention are suitable for use in many applications, but are believed to be particularly well-suited for use in thermoplastic polymer compositions. In particular, the additive compositions of the invention can be used to improve the optical properties (e.g., haze and/or clarity) of thermoplastic polymer compositions, such as polypropylene-containing thermoplastic polymer compositions. For example, it is believed that the additive compositions of the invention can be used to produce thermoplastic polymer compositions exhibiting improved optical properties relative to thermoplastic polymer compositions containing the same amount of the clarifying agent delivered in a different form (e.g., a thermoplastic polymer composition that contains the same amount of the clarifying agent that has been added to the polymer composition in the form of a powder). Indeed, it is also believed that the additive compositions of the invention are capable of producing thermoplastic polymer compositions exhibiting optical properties that are comparable to the optical properties exhibited by thermoplastic polymer compositions containing higher concentrations of the clarifying agent delivered in a different form (i.e., a thermoplastic polymer composition that contains more of the clarifying agent that has been added to the polymer composition in the form of a powder). In this instance, it is believed that the additive compositions of the invention may be used to reduce the amount of the clarifying agent required to produce a thermoplastic polymer composition having a desired set of optical properties.

Furthermore, the liquid form of the additive compositions of the invention is believed to provide certain advantages in handling relative to powdered additive composition. For example, some powdered additive compositions (e.g., clarifying agents) are known to form agglomerates that are difficult to evenly disperse or distribute upon addition of the additive composition to a powdered or pelletized thermoplastic polymer. The resulting uneven dispersion or distribution can hamper the full realization of the benefits to be gained from incorporating the additive composition into the thermoplastic polymer. The additive compositions of the invention, being in liquid form, are believed to be less susceptible to such agglomeration and, therefore, should provide a means to more evenly distribute or disperse the additive composition in the thermoplastic polymer. This more even distribution or dispersion is believed to contribute, at least in part, to the benefits observed when using the additive compositions of the invention.

In a first embodiment, the invention provides an additive composition comprising a liquid, hydrocarbon medium, a clarifying agent, and a surfactant having an HLB of about 6 or less. The clarifying agent can comprise an acetal of an alditol.

In a second embodiment, the invention provides an additive composition comprising a clarifying agent and a liquid medium. The clarifying agent can comprise an acetal of an alditol. The liquid medium can be selected from the group consisting of hydrocarbons, surfactants having an HLB of about 6 or less, and mixtures thereof.

In a third embodiment, the invention provides an additive composition comprising about 79.5 wt. % or less of a mineral oil; about 10 to about 30 wt. % of a clarifying agent conforming to the structure of Formula (II) below:

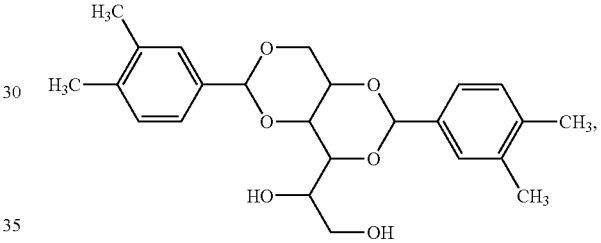

,and about 0.5 to about 80 wt. % of sorbitan monooleate.

In a fourth embodiment, the invention provides a method for producing a thermoplastic polymer composition. The method comprises the steps of providing a thermoplastic polymer, providing an additive composition according to the invention, and mixing the thermoplastic polymer and the additive composition to produce a thermoplastic polymer composition.

DETAILED DESCRIPTION OF THE INVENTION

As noted above, the present invention generally provides additive compositions comprising a clarifying agent and a liquid medium, as well as thermoplastic compositions containing such additive compositions.

The clarifying agent present in the additive composition of the invention can be any suitable clarifying agent. Preferably, the clarifying agent is an acetal of an alditol. For example, the acetal compound can be the product of the reaction between an alditol and a benzaldehyde. The alditol compound can be an unsubstituted alditol (e.g., xylitol or sorbitol) or a substituted alditol (e.g., 1,2,3-trideoxynonitol or 1,2,3-trideoxyynon-1-enitol). The benzaldehyde compound can be an unsubstituted benzaldehyde or a substituted benzaldehyde (e.g., 3,4-dimethylbenzaldehyde or 4-propylbenzaldehyde). Furthermore, the acetal compound produced by the reaction can be a mono-acetal, di-acetal, or tri-acetal compound (i.e., a compound containing one, two, or three acetal groups, respectively).

In certain embodiments, the additive composition comprises an acetal of an alditol conforming to the structure of Formula (I) below:

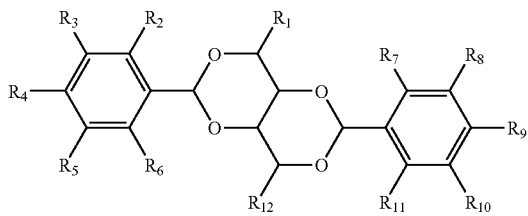

In the structure of Formula (I), $R_1$ can be selected from the group consisting of hydrogen, alkyl groups, alkenyl groups, hydroxyalkyl groups, alkoxy groups, and alkyl halide groups. $R_2$, $R_3$, $R_4$, $R_5$, $R_6$, $R_7$, $R_8$, $R_9$, $R_{10}$, and $R_{11}$ can each be independently selected from the group consisting of hydrogen, alkyl groups, alkoxy groups, alkenyl groups, aryl groups, and halogens. $R_{12}$ can be a hydroxyalkyl group selected from the group consisting of —$CH_2OH$ and —$CHOHCH_2OH$.

In certain embodiments, the clarifying agent is a compound conforming to the structure of Formula (I) in which $R_1$ is hydrogen and $R_{12}$ is —$CHOHCH_2OH$. Thus, in such embodiments, the clarifying agent can be an acetal compound produced by the reaction of sorbitol and a benzaldehyde compound (e.g., an unsubstituted benzaldehyde or a substituted benzaldehyde). In such embodiments, $R_2$, $R_3$, $R_4$, $R_5$, $R_6$, $R_7$, $R_8$, $R_9$, $R_{10}$, and $R_{11}$ can each be independently selected from the group consisting of hydrogen, alkyl groups, alkoxy groups, alkenyl groups, aryl groups, and halogens. In a more specific embodiment, $R_2$, $R_5$, $R_6$, $R_7$, $R_8$, and $R_{11}$ can each be hydrogen, and $R_3$, $R_4$, $R_9$, and $R_{10}$ can each be alkyl groups. In a more specific embodiment, $R_2$, $R_5$, $R_6$, $R_7$, $R_8$, and $R_{11}$ can each be hydrogen, and $R_3$, $R_4$, $R_9$, and $R_{10}$ can each be methyl groups.

In certain embodiments, $R_1$ can be selected from the group consisting of alkyl groups and alkenyl groups. Thus, in such embodiments, the clarifying agent can be an acetal compound produced by the reaction of a substituted alditol (e.g., 1,2,3-trideoxynonitol or 1,2,3-trideoxynon-1-enitol) and a benzaldehyde compound (e.g., an unsubstituted benzaldehyde or a substituted benzaldehyde). In such embodiments, $R_2$, $R_3$, $R_4$, $R_5$, $R_6$, $R_7$, $R_8$, $R_9$, $R_{10}$, and $R_{11}$ can each be independently selected from the group consisting of hydrogen, alkyl groups, alkoxy groups, alkenyl groups, aryl groups, and halogens. In a more specific embodiment, $R_1$ is selected from the group consisting of alkyl groups and alkenyl groups, $R_2$, $R_3$, $R_5$, $R_6$, $R_7$, $R_8$, $R_{10}$, and $R_{11}$ are each hydrogen, $R_{12}$ is —$CHOHCH_2OH$, and $R_4$ and $R_9$ are each alkyl groups. In a more specific embodiment, $R_1$ is an n-propyl group, $R_2$, $R_3$, $R_5$, $R_6$, $R_7$, $R_8$, $R_{10}$, and $R_{11}$ are each hydrogen, $R_{12}$ is —$CHOHCH_2OH$, and $R_4$ and $R_9$ are each n-propyl groups.

The clarifying agent can be present in the additive composition in any suitable amount. In certain embodiments, the clarifying agent can be present in the additive composition in an amount of about 1% wt. or more, about 5 wt. % or more, about 10 wt. % or more, about 15 wt. % or more, or about 20 wt. % or more, based on the total weight of the additive composition. In certain embodiments, the clarifying agent can be present in the additive composition in an amount of about 50 wt. % or less, about 40 wt. % or less, about 30 wt. % or less, or about 25 wt. % or less, based on the total weight of the additive composition. Thus, in certain embodiments, the clarifying agent can be present in the additive composition in an amount of about 1 to about 50 wt. %, about 5 to about 40 wt. %, about 10 to about 30 wt. %, or about 15 to about 25 wt. % (e.g., about 20 to about 25 wt. %), based on the total weight of the additive composition.

As noted above, the additive compositions of the invention comprise a liquid medium. The liquid medium is selected from the group consisting of liquid hydrocarbons, surfactants, and combinations thereof. The liquid hydrocarbons suitable for use in the additive composition of the invention can be any suitable liquid hydrocarbons. As utilized herein, the term "hydrocarbon" is intended to generally refer to organic compounds consisting entirely of carbon atoms and hydrogen atoms. Thus, the term "hydrocarbon" is intended to include alkanes, alkenes, alkynes, cycloalkanes, arenes (i.e., aromatic hydrocarbons), and combinations and mixtures thereof. The terms "liquid hydrocarbon" and "liquid, hydrocarbon medium," as utilized herein, are intended to refer to hydrocarbons that are liquid at a temperature of from about 10° C. to about 40° C. (e.g., about 15° C. to about 35° C. or about 20° C. to about 30° C.) and a pressure of from about 80 kPa to about 101 kPa. In certain embodiments, the liquid hydrocarbon medium can be selected from the group consisting of paraffinic oils (e.g., oils comprised of alkanes, such as n-alkanes), naphthenic oils (e.g., oils comprised of cycloalkanes), aromatic oils (e.g., oils comprised of arenes or aromatic hydrocarbons), and mixtures thereof. In certain embodiments, the liquid hydrocarbon medium can be a mixture of paraffinic oils and naphthenic oils, such as a mineral oil. Suitable mineral oils include, but are not limited to, the light mineral oils sold by Penreco under the name DRAKEOL® (e.g., DRAKEOL® 7 light mineral oil NF).

As noted above, the additive composition can comprise a surfactant. The surfactant can be present in the additive composition alone or in combination with a liquid hydrocarbon as described above. The surfactants suitable for use in the additive composition typically are liquid at a temperature of from about 10° C. to about 40° C. (e.g., about 15° C. to about 35° C. or about 20° C. to about 30° C.) and a pressure of from about 80 kPa to about 101 kPa. In certain embodiments, the surfactant has a Hydrophilic-Lipophilic balance (HLB) of about 6 or less. In certain embodiments, the surfactant can be a nonionic surfactant. In certain embodiments, the surfactant can be selected from the group consisting of sorbitan esters, including but not limited to, sorbitan monooleate, sorbitan trioleate, sorbitan monostearate, sorbitan tristearate, and mixtures thereof. In certain embodiments, the surfactant can be a sorbitan monooleate surfactant, such as SPAN® 80 surfactant.

The liquid medium (e.g., liquid hydrocarbon, surfactant, or combination thereof) typically is the major component of the additive composition, providing a medium in which the clarifying agent and any other solid components in the composition (see below) are dispersed or suspended. The liquid medium can be present in the composition in any suitable amount that provides a medium for the dispersion or suspension of the clarifying agent and other solid components of the additive composition. As utilized herein, the terms "dispersed", "dispersion," "suspended," and "suspension" are intended to refer to a system in which the clarifying agent is distributed throughout the liquid medium and does not settle out to an appreciable extent over the shelf life of the product. Thus, while the terms are used in such a way as to encompass colloidal systems (e.g., additive compositions in which the clarifying agent disperse phase has dimensions on the order of about 1 nm to about 1 μm), the terms also encompass additive compositions in which the additive composition disperse phase is larger than about 1 μm, provided the clarifying agent does not settle out to an appreciable extent over the shelf life of the product.

In certain embodiments, the liquid medium is present in the additive composition in an amount of about 50 wt. % or more, about 60 wt. % or more, about 70 wt. % or more, or about 75 wt. % or more, based on the total weight of the additive composition. In certain embodiments, the liquid medium is present in the additive composition in an amount of about 99 wt. % or less, about 95 wt. % or less, about 90 wt. % or less, about 85 wt. % or less, or about 80 wt. % or less, based on the total weight of the additive composition. Thus, in certain embodiments, the liquid medium can be present in the additive composition in an amount of about 99 to about 50 wt. %, about 95 to about 60 wt. %, about 90 to about 70 wt. %, about 85 to about 75 wt. % (e.g., about 80 to about 75 wt. %), based on the total weight of the additive composition.

In certain embodiments of the additive composition of the invention, the additive composition comprises a liquid, hydrocarbon medium and the liquid, hydrocarbon medium is present in the additive composition in an amount of about 79.5 wt. % or less, based on the total weight of the additive composition. In certain embodiments of the additive composition of the invention, the additive composition comprises a surfactant and the surfactant is present in the additive composition in an amount of about 0.5 to about 80 wt. %, based on the total weight of the additive composition.

The additive compositions of the invention can comprise components in addition to the clarifying agent and the liquid medium. For example, the additive composition can comprise antioxidants, slip agents, pigments, optical brighteners, ultraviolet absorbers, and other common thermoplastic polymer additives. In certain embodiments, the composition can further comprise silica, such as a hydrophobic fumed silica. When present in the additive composition, the silica can be present in the additive composition in an amount of about 0.2 to about 1.0 wt. % based on the total weight of the additive composition.

The additive compositions of the invention can be made by any suitable method. For example, the additive compositions of the invention can be made by simply adding the individual components together and mixing until an additive composition having the desired dispersion or suspension is produced. When the additive composition comprises both a liquid, hydrocarbon medium and a surfactant, the liquid, hydrocarbon medium and the surfactant can be combined in the desired amounts and mixed to produce a substantially homogeneous mixture. Once the liquid, hydrocarbon medium and surfactant have been pre-blended, the clarifying agent and additional components (if present) can be added and the mixture mixed (e.g., high-intensity mixed) to produce a substantially homogeneous dispersion or suspension.

As noted above, the additive compositions of the invention are believed to be particularly well-suited for use in thermoplastic compositions. In particular, the additive compositions of the invention can be combined with one or more thermoplastic polymers to produce a thermoplastic polymer composition. The thermoplastic polymer used to produce the thermoplastic polymer compositions of the invention can be any suitable thermoplastic polymer. Suitable thermoplastic polymers include, but are not limited to, polyolefins, polyesters (e.g., polyethylene terephthalate), polyamides, polystyrenes, or polyketones (e.g., polyketones having carbonyl groups in their backbone). In certain embodiments, the thermoplastic polymer can be a polyolefin selected from the group consisting of polymers and copolymers of aliphatic mono-olefins containing from 2 to 6 carbon atoms. These polymers and copolymers can have an average molecular weight of from about 10,000 to about 2,000,000, or about 30,000 to about 300,000. In certain embodiments, the thermoplastic polymer is a polyolefin selected from the group consisting of polyethylenes (e.g., linear low density polyethylene, low density polyethylene, and high density polyethylene), polypropylenes, crystalline ethylene/propylene copolymers (random or block), poly(1-butene) and polymethylpentene. In certain embodiments, the thermoplastic polymer is a polyolefin selected from the group consisting of polypropylenes, polyethylenes, and mixtures thereof. In certain embodiments, the thermoplastic polymer is a polypropylene selected from the group consisting of polypropylene homopolymers, polypropylene random copolymers, polypropylene impact copolymers, and mixtures thereof. In a more specific embodiment, the thermoplastic polymer is a polypropylene random copolymer.

The additive composition of the invention can be present in the thermoplastic polymer composition in any suitable amount. In certain embodiment, the additive composition is present in the thermoplastic polymer composition in an amount of about 0.4 to about 2.0 wt. % based on the total weight of the thermoplastic polymer composition. The additive composition can also be added to the thermoplastic polymer in an amount sufficient to provide a concentration of the clarifying agent falling within a desired range. Thus, as the concentration of the clarifying agent within the additive compositions varies, the amount of a particular additive composition necessary to provide the desired concentration will also vary. In certain embodiments, the additive composition is present in the thermoplastic polymer composition in an amount sufficient to provide an amount of clarifying agent of between about 100 to about 20,000 ppm, about 100 to about 10,000 ppm, about 100 to about 5,000 ppm, about 500 to about 3,000 ppm or about 500 to about 2,500 ppm (e.g., about 800 to about 2,500 ppm), based on the total weight of the thermoplastic polymer composition.

The thermoplastic polymer composition of the invention can be made by any suitable method. In the most general terms, the thermoplastic polymer composition can be made by a method comprising the steps of providing a thermoplastic polymer, providing an additive composition according to the invention, and mixing the thermoplastic polymer and the additive composition to produce a thermoplastic polymer composition. The thermoplastic polymer and the additive composition can be mixed by any suitable means. For example, the additive composition can be sprayed onto a powdered or pelletized thermoplastic polymer and the resulting mixture can then be low intensity mixed to substantially evenly distribute the additive composition in the thermoplastic polymer.

The following example further illustrates the subject matter described above but, of course, should not be construed as in any way limiting the scope thereof.

Example 1

This example demonstrates the production of additive compositions according to the invention as well as the optical properties exhibited by thermoplastic polymer compositions according to the invention. Six additive compositions (Samples 1A-1F) were produced by blending various amounts of a light mineral oil (DRAKEOL® 7 light mineral oil NF from Penreco), a surfactant (SPAN® 80), and a clarifying agent (MILLAD® 3988i clarifying agent from Milliken Chemical, a division of Milliken & Company). The additive compositions were produced by pre-blending the mineral oil and surfactant and then adding the clarifying agent. The resulting mixture was high intensity mixed until a substantially uniform dispersion or suspension was formed. The amounts of mineral oil, surfactant, and clarifying agent used in each of the additive compositions is set forth in Table 1 below.

TABLE 1

Amounts of mineral oil, surfactant, and clarifying agent in Samples 1A-1F.

| Sample | Mineral oil (wt. %) | Surfactant (wt. %) | Clarifying agent (wt. %) |
|---|---|---|---|
| 1A | 79 | 1 | 20 |
| 1B | 70 | 10 | 20 |
| 1C | 60 | 20 | 20 |
| 1D | 40 | 40 | 20 |
| 1E | 20 | 60 | 20 |
| 1F | 0 | 80 | 20 |

Each of the resulting additive compositions (Samples 1A-1F) was then added to a polypropylene random copolymer to produce two thermoplastic polymer compositions. The first thermoplastic polymer composition contained an amount of the additive composition sufficient to provide a concentration of the clarifying agent of approximately 1,000 ppm based on the total weight of the thermoplastic polymer composition, and the second thermoplastic polymer composition contained an amount of the additive composition sufficient to provide a concentration of the clarifying agent of approximately 2,000 ppm based on the total weight of the thermoplastic polymer composition. The thermoplastic polymer compositions were produced by adding the additive composition to the pelletized polypropylene random copolymer and low intensity mixing to substantially evenly distribute the additive composition in the pelletized polypropylene random copolymer.

Two comparative thermoplastic polymer compositions were also produced by adding a masterbatch containing the same clarifying agent (MILLAD® 3988i clarifying agent from Milliken Chemical, a division of Milliken & Company) to the same polypropylene random copolymer. The masterbatch comprised approximately 10 wt. % of the clarifying agent in a polypropylene homopolymer carrier. To produce the comparative thermoplastic polymer compositions, the masterbatch was let-down into the polypropylene random copolymer in an amount sufficient to yield a first thermoplastic polymer composition containing approximately 1,000 ppm of the clarifying agent (Comparative Example 1) and a second thermoplastic polymer composition containing approximately 2,000 ppm of the clarifying agent (Comparative Example 2). The thermoplastic polymer compositions were produced by adding the masterbatch to the pelletized polypropylene random copolymer and low intensity mixing to substantially evenly distribute the masterbatch in the pelletized polypropylene random copolymer.

The pelletized polypropylene random copolymer compositions were then used to form plaques by injection molding the compositions on an injection molder. The resulting plaques were then tested in accordance with ASTM Standard D1003-92 using a BYK-Gardner Haze-Gard Plus to determine the percent haze for each of the polypropylene random copolymer compositions. The results for each of these measurements are set forth in Table 2 below.

TABLE 2

Haze measurements for polypropylene random copolymer compositions produced using Samples 1A-1F and Comparative Examples 1 and 2.

| Polymer Composition | Sample | Clarifying Agent (ppm) | Haze (%) |
|---|---|---|---|
| Comp. Ex. 1 | — | 1,000 | 22.7 |
| 1 | 1A | 1,000 | 20.5 |
| 2 | 1B | 1,000 | 18.6 |
| 3 | 1C | 1,000 | 19.3 |
| 4 | 1D | 1,000 | 16.1 |
| 5 | 1E | 1,000 | 13.9 |
| 6 | 1F | 1,000 | 13.8 |
| Comp. Ex. 2 | — | 2,000 | 9.0 |
| 7 | 1A | 2,000 | 9.1 |
| 8 | 1B | 2,000 | 8.9 |
| 9 | 1C | 2,000 | 8.4 |
| 10 | 1D | 2,000 | 9.0 |
| 11 | 1E | 2,000 | 10.1 |
| 12 | 1F | 2,000 | 10.8 |

As can be seen from a comparison of the haze values for Comparative Example 1 and Polymer Compositions 1-6, at a 1,000 ppm loading of the clarifying agent, the thermoplastic polymer compositions containing an additive composition according to the invention all exhibited haze values that were demonstrably lower than the haze value exhibited by a thermoplastic polymer composition containing the same amount of clarifying agent added in a different manner (i.e., Comparative Example 1). Indeed, Polymer Compositions 5 and 6 exhibited haze values that were approaching the haze value exhibited by Comparative Example 2, which contained twice as much clarifying agent (i.e., 2,000 ppm of clarifying agent).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to", ) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A thermoplastic polymer composition comprising:
(a) a thermoplastic polymer; and
(b) an additive composition, the additive composition comprising:
(i) a liquid, hydrocarbon medium;
(ii) a clarifying agent, the clarifying agent comprising an acetal of an alditol; and
(iii) a surfactant having an HLB of about 6 or less, the surfactant being selected from the group consisting of sorbitan monooleate, sorbitan trioleate, sorbitan monostearate, sorbitan tristearate, and mixtures thereof;
wherein the additive composition is present in the thermoplastic polymer composition in an amount of about 0.4 to about 2.0 wt. % based on the total weight of the thermoplastic polymer composition.

2. The thermoplastic polymer composition of claim 1, wherein the liquid, hydrocarbon medium is selected from the group consisting of paraffinic oils, naphthenic oils, aromatic oils, and mixtures thereof.

3. The thermoplastic polymer composition of claim 1, wherein the clarifying agent is present in the additive composition in an amount of about 10 to about 30 wt. % based on the total weight of the additive composition.

4. The thermoplastic polymer composition of claim 1, wherein the surfactant is present in the additive composition in an amount of about 0.5 to about 80 wt. % based on the total weight of the additive composition.

5. The thermoplastic polymer composition of claim 1, wherein the liquid, hydrocarbon medium is present in the additive composition in an amount of about 79.5 wt. % or less based on the total weight of the additive composition.

6. The thermoplastic polymer composition of claim 1, wherein the clarifying agent is an acetal of an alditol conforming to the structure of Formula (I) below:

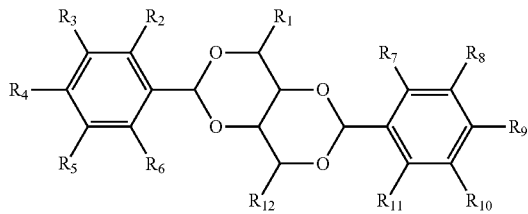

wherein $R_1$ is selected from the group consisting of hydrogen, alkyl groups, alkenyl groups, hydroxyalkyl groups, alkoxy groups, and alkyl halide groups; wherein $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, and halogens; and wherein $R_{12}$ is a hydroxyalkyl group selected from the group consisting of $-CH_2OH$ and $-CHOHCH_2OH$.

7. The thermoplastic polymer composition of claim 6, wherein $R_1$ is hydrogen and $R_{12}$ is $-CHOHCH_2OH$.

8. The thermoplastic polymer composition of claim 6, wherein $R_2$, $R_5$, $R_6$, $R_7$, $R_8$, and $R_{11}$ are each hydrogen, and $R_3$, $R_4$, $R_9$, and $R_{10}$ are each methyl groups.

9. The thermoplastic polymer composition of claim 1, wherein the additive composition comprises:
(a) about 79.5 wt. % or less of a mineral oil;
(b) about 10 to about 30 wt. % of a clarifying agent conforming to the structure of Formula (II) below:

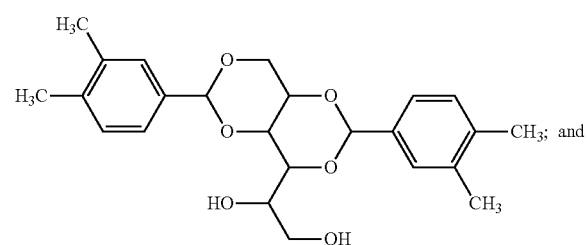

and
(c) about 0.5 to about 80 wt. % of sorbitan monooleate.

* * * * *